US012628200B2

(12) United States Patent
Madpuwar et al.

(10) Patent No.: US 12,628,200 B2
(45) Date of Patent: May 12, 2026

(54) EARLY FRAME CHECK SEQUENCE (FCS) FOR TRIGGER FRAME VALIDATION

(71) Applicant: Synaptics Incorporated, San Jose, CA (US)

(72) Inventors: Girish Anantrao Madpuwar, Bangalore (IN); Saishankar Nandagopalan, San Diego, CA (US)

(73) Assignee: Synaptics Incorporated, San Jose, CA (US)

( * ) Notice: Subject to any disclaimer, the term of this patent is extended or adjusted under 35 U.S.C. 154(b) by 163 days.

(21) Appl. No.: 18/514,585

(22) Filed: Nov. 20, 2023

(65) Prior Publication Data

US 2025/0168875 A1     May 22, 2025

(51) Int. Cl.
*H04W 74/0808* (2024.01)
*H04L 5/00* (2006.01)
(52) U.S. Cl.
CPC ....... *H04W 74/0808* (2013.01); *H04L 5/0048* (2013.01)
(58) Field of Classification Search
CPC ............. H04W 74/0808; H04L 5/0048; H04L 5/0053; H04L 5/0091
See application file for complete search history.

(56) References Cited

U.S. PATENT DOCUMENTS

2025/0150197 A1 * 5/2025 Chu ..................... H04L 1/0008

FOREIGN PATENT DOCUMENTS

EP          4503809 A1 *  2/2025  ........... H04W 52/02
WO     2023189200 A1   10/2023

OTHER PUBLICATIONS

EP Search Report dated Apr. 8, 2025, from EP 24213542.4-1206, filed Nov. 18, 2024.
Fischer Matthew et al: "Post-FCS MAC padding", Nov. 1, 2023 (Nov. 1, 2023), pp. 1-13, XP093265390, Retrieved from the Internet: URL:https://mentor.ieee.org/802.11/dcn/23/11-23-1873-01-00bn-post-fcs-mac-padding.pptx, pp. 5,8,9.

(Continued)

*Primary Examiner* — Brian T Le
(74) *Attorney, Agent, or Firm* — Paradice & Li LLP

(57)                ABSTRACT

This disclosure provides methods, devices, and systems for wireless communications. The present implementations more specifically relate to trigger frame designs that support early validation of trigger frames. In some aspects, an AP may transmit a trigger frame soliciting a trigger-based (TB) physical layer convergence protocol (PLCP) protocol data unit (PPDU) from one or more wireless stations (STAs), where the trigger frame includes one or more user information fields, an early frame check sequence (eFCS) following the user information fields, a series of padding bits following the eFCS, and a frame check sequence (FCS) following the series of padding bits. Each STA associated with the AP may receive and validate a first portion of the trigger frame based on the eFCS. Any non-solicited STAs that receive the trigger frame may enter a low power mode in response to validating the first portion of the trigger frame, without receiving the padding bits.

20 Claims, 8 Drawing Sheets

(56)             References Cited

OTHER PUBLICATIONS

Laurent Cariou (Intel): "Client power save", IEEE Draft; H04L 11-23-2003-00-00BN-Client-Power-Save, H04W IEEE-SA Mentor, Piscataway, NJ USA, vol. 802.11 UHR; 802.11bn Nov. 13, 2023 (Nov. 13, 2023), pp. 1-11, XP068207084, Retrieved from the Internet: URL:https://mentor.ieee.org/802.11/dcn/23/11-23-2003-00-00bn-client-power-save.pptx [retrieved on Nov. 13, 2023] pp. 4,5,9.
Alfred Asterjadhi (Qualcomm Inc): "Thoughts on Secure Control frames", IEEE Draft; 11-23-0312-00-0UHR-Thoughts-on-Secure-Cont rol-Frames, IEEE-SA Mentor, Piscataway, NJ USA, vol. 802.11 UHR May 14, 2023 (May 14, 2023), pp. 1-12, XP068203160, Retrieved from the Internet: URL:https://mentor.ieee.org/802.11/dcn/23/11-23-0312-00-0uhr-thoughts-on-secure-control-frames.pptx [retrieved on May 14, 2023] pp. 5,6,9.

* cited by examiner

FIG. 6

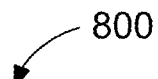

800

Receive a trigger frame soliciting a TB PPDU from one or more wireless communication devices, where the trigger frame includes one or more user information fields, a first FCS following the one or more user information fields, a plurality of padding bits following the first FCS, and a second FCS following the plurality of padding bits. (810)

Validate a portion of the trigger frame based on the first FCS. (820)

Selectively enter a low power mode, based on the one or more user information fields, in response to validating the portion of the trigger frame and without receiving the plurality of padding bits. (830)

FIG. 8

EARLY FRAME CHECK SEQUENCE (FCS) FOR TRIGGER FRAME VALIDATION

TECHNICAL FIELD

The present implementations relate generally to wireless communication, and specifically to early frame check sequence (FCS) for trigger frame validation.

BACKGROUND OF RELATED ART

A wireless local area network (WLAN) may be formed by one or more access points (APs) that provide a shared wireless communication medium for use by a number of client devices, also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a BSS Identifier (BSSID) that is advertised by the AP. An AP periodically broadcasts beacon frames to enable any STAs within wireless range of the AP to establish or maintain a communication link with the WLAN. The process of establishing a communication link is generally referred to as "association," and involves an exchange of association frames between an AP and a STA. The STA is "associated" with the AP upon completion of the association process.

Many STAs are battery-operated devices with limited power budgets. Some STAs may enter a low power mode (also referred to as a "power save" mode) to conserve power and extended battery life. However, while operating in the low power mode, a STA cannot transmit, receive, or listen to communications on a wireless channel. Thus, there is a need to increase the opportunities for a STA to enter or remain in a low power mode without hindering the STA's ability to communicate with a WLAN.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by a wireless communication device. The method includes receiving a trigger frame soliciting a trigger-based (TB) physical layer convergence protocol (PLCP) protocol data unit (PPDU) from one or more wireless communication devices, where the trigger frame includes one or more user information fields, a first frame check sequence (FCS) following the one or more user information fields, a plurality of padding bits following the first FCS, and a second FCS following the plurality of padding bits; validating a portion of the trigger frame based on the first FCS; and selectively entering a low power mode, based on the one or more user information fields, in response to validating the portion of the trigger frame and without receiving the plurality of padding bits.

Another innovative aspect of the subject matter of this disclosure can be implemented in a wireless communication device including a processing system and a memory. The memory stores instructions that, when executed by the processing system, causes the wireless communication device to receive a trigger frame soliciting a TB PPDU from one or more wireless communication devices, where the trigger frame includes one or more user information fields, a first FCS following the one or more user information fields, a plurality of padding bits following the first FCS, and a second FCS following the plurality of padding bits; validate a portion of the trigger frame based on the first FCS; and selectively enter a low power mode, based on the one or more user information fields, in response to validating the portion of the trigger frame and without receiving the plurality of padding bits.

BRIEF DESCRIPTION OF THE DRAWINGS

The present implementations are illustrated by way of example and are not intended to be limited by the figures of the accompanying drawings.

FIG. 6 shows another timing diagram depicting example wireless communications between an AP and a number of STAs associated with the AP, according to some implementations.

FIG. 8 shows an illustrative flowchart depicting an example trigger frame validation operation based on an early frame check sequence (FCS), according to some implementations.

DETAILED DESCRIPTION

Figure 1:
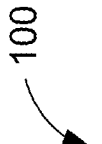
FIG. 1 shows an example wireless communication network.
Figure 1:
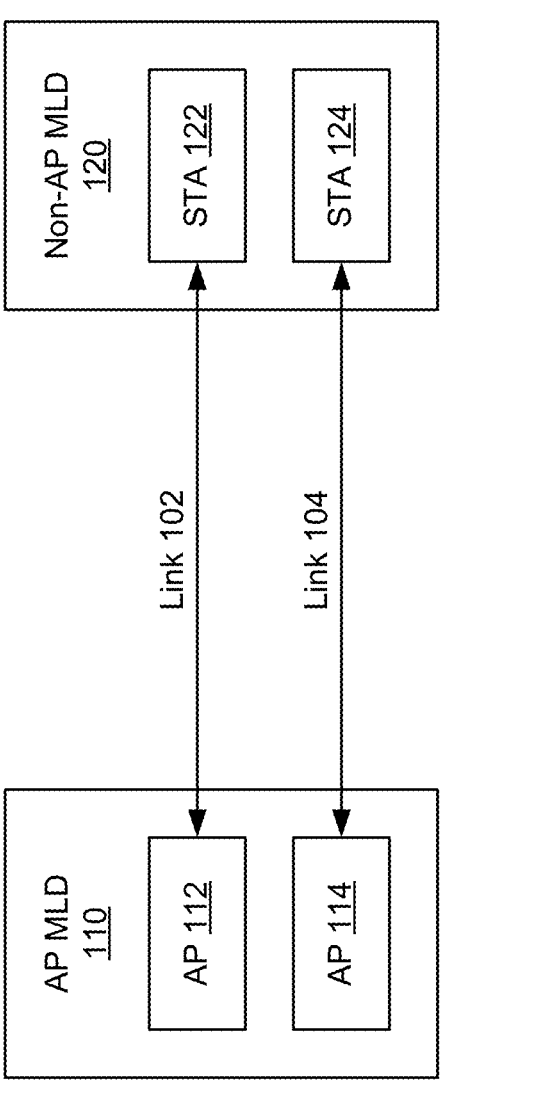

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the present disclosure can be implemented by any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the $3^{rd}$ Generation Partnership Project (3GPP), among others. Aspects of the present disclosure can be implemented by any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. Aspects of the present disclosure also can be implemented using other wireless communication protocols or RF signals suitable for use in one or more of a wireless personal area network (WPAN), a wireless local area network (WLAN), a wireless wide area network (WWAN), or an Internet of Things (IoT) network.

As described above, a wireless local area network (WLAN) may be formed by one or more access points (APs) that provide a shared wireless communication medium for use by a number of wireless stations (STAs). The basic building block of a WLAN conforming to the IEEE 802.11 family of standards is a Basic Service Set (BSS), which is managed by an AP. An AP periodically broadcasts beacon frames to enable any STAs within wireless range of the AP to establish or maintain a communication link with the WLAN. The process of establishing a communication link is generally referred to as "association," and involves an exchange of association frames between an AP and a STA. The STA is "associated" with the AP upon completion of the association process.

Access to the shared wireless medium is generally governed by a distributed coordination function (DCF), such as carrier sense multiple access with collision avoidance (CSMA/CA). With CSMA/CA, there is generally no centralized master device allocating time and frequency resources of the shared wireless medium. Rather, any wireless communication device (such as an AP or a STA) attempting to transmit data must wait a random backoff (RBO) duration and contend for access to the wireless medium. More specifically, after the RBO duration expires, a wireless communication device must perform a clear channel assessment (CCA) and determine that the desired wireless channel is idle before it can transmit data on that channel.

Newer versions of the IEEE 802.11 standard support trigger-based uplink communications. Specifically, the IEEE 802.11ax (and 802.11be) amendment of the IEEE 802.11 standard defines a trigger frame format which can be used to solicit the transmission of trigger-based (TB) physical layer convergence protocol (PLCP) protocol data units (PPDUs) from one or more STAs. The trigger frame allocates resources for the transmission of the TB PPDU and indicates how the TB PPDU is to be configured for transmission. The TB PPDU must be transmitted within a short interframe space (SIFS) duration following the trigger frame to prevent other wireless communication devices from sensing an idle medium and capturing the channel in the interim.

Any STAs that are not solicited by a trigger frame may operate in a low power mode for the duration allocated for a TB PPDU. However, solicited STAs need time to prepare the transmission of the TB PPDU in response to receiving the trigger frame. Moreover, different STAs may require different amounts of time to transition between receiving a trigger frame and transmitting a TB PPDU. Existing trigger frame formats support the inclusion of padding bits which can be used to extend the duration of a trigger frame so that the solicited STAs can respond within a SIFS duration. The padding bits do not carry any meaningful information and are merely used to keep the wireless channel occupied or busy while the solicited STAs prepare to transmit the TB PPDU.

Existing trigger frame formats include a frame check sequence (FCS) at the end of each frame, following the series of padding bits (if any). The FCS may be used to determine whether the trigger frame contains any errors (such as through a checksum validation process). If the validation fails, the trigger frame is dropped or discarded. As such, any recipients of existing trigger frames, including solicited STAs and non-solicited STAs, often must receive a series of padding bits in order to obtain the FCS at the end of each frame. Aspects of the present disclosure recognize that, because the padding bits do not carry any useful information, a non-solicited STA can further extend its battery life, without hindering its ability to communicate with a WLAN, by entering a low power mode without receiving the padding bits.

Various aspects relate generally to reducing power consumption in wireless communication devices, and more particularly, to trigger frame designs that support early validation of trigger frames. As used herein, the term "early FCS" (eFCS) refers to any frame check sequence that appears before the end of a trigger frame. In some aspects, an AP may transmit a trigger frame soliciting a TB PPDU from one or more STAs, where the trigger frame includes one or more user information fields, an eFCS following the user information fields, a series of padding bits following the eFCS, and an FCS following the series of padding bits. In some implementations, each STA associated with the AP may receive and validate a first portion of the trigger frame based on the eFCS. Each of the one or more solicited STAs may transmit a TB PPDU, to the AP, a SIFS duration following the reception of the trigger frame. However, any non-solicited STAs that receive the trigger frame may enter a low power mode in response to validating the first portion of the trigger frame (based on the eFCS) and without receiving the padding bits.

Particular implementations of the subject matter described in this disclosure can be implemented to realize one or more of the following potential advantages. By including an eFCS in trigger frames, aspects of the present disclosure can reduce the power consumption of wireless communication devices without hindering their ability to communicate with a WLAN. More specifically, a non-solicited STA that receives a trigger frame can validate the frame based on the eFCS and enter a low power mode earlier than would otherwise be supported by existing trigger frame formats. As described above, an AP may use padding bits to extend the duration of a trigger frame so that the solicited STAs can transmit a TB PPDU a SIFS duration after receiving the trigger frame. According to existing versions of the IEEE 802.11 standard, the padding bits may extend a trigger frame by up to 256 µs. Thus, a non-solicited STA that enters a low power mode prior to receiving the padding bits can potentially extend its low power duration by up to 256 µs per trigger frame.

FIG. 1 shows an example wireless communication network 100. In some aspects, the wireless communication network 100 may be a wireless local area network (WLAN), such as a Wi-Fi network, that supports multi-link operation (MLO). For example, the network 100 may implement at least one of the IEEE 802.11 family of wireless communication protocol standards including, but not limited to, the 802.11ax or 802.11be amendments.

Wireless communication devices (including APs and STAs) with MLO capabilities may be referred to as multi-link devices (MLDs). For example, an AP MLD is an AP entity capable of communicating, and establishing a BSS, on multiple communication links. A non-AP MLD (also referred to as a "STA MLD") is a client device, such as a STA, capable of communicating with an AP MLD on multiple communication links. In the example of FIG. 1, the network 100 is shown to include an AP MLD 110 and a non-AP MLD 120. Although only one AP MLD 110 and one non-AP MLD 120 are shown in FIG. 1, the network 100 may include any number wireless communication devices including, but not limited to, APs, STAs, AP MLDs, or non-AP MLDs.

The AP MLD 110 includes multiple APs 112 and 114 associated with (or operating on) communication links 102 and 104, respectively. In the example of FIG. 1, the AP MLD 110 is shown to include two APs 112 and 114. However, in some implementations, the AP MLD 110 may include more APs than those depicted in FIG. 1. The APs 112 and 114 may share a common association context (through the AP MLD 110). However, each of the APs 112 and 114 may establish a respective BSS on its associated communication link. The APs 112 and 114 also may establish their respective communication links 102 and 104 on different frequency bands. For example, the AP 112 may operate at a carrier frequency equal to 2.4 GHz and the AP 114 may operate at a higher carrier frequency (such as 5 GHZ, 6 GHZ, 45 GHZ, or 60 GHZ).

The non-AP MLD 120 includes multiple STAs 122 and 124 that may be configured to communicate on the communication links 102 and 104, respectively. For example, the STA 122 may operate at the same carrier frequency as the AP 112 and the STA 124 may operate at the same carrier frequency as the AP 114. In the example of FIG. 1, the non-AP MLD 120 is shown to include two STAs 122 and 124. However, in some implementations, the non-AP MLD 120 may include more STAs than those depicted in FIG. 1. Existing versions of the IEEE 802.11 standard define several modes in which a non-AP MLD may operate. The various operating modes depend on the number of wireless radios associated with the non-AP MLD and its ability to communicate (such as by transmitting or receiving) concurrently on multiple communication links.

In some implementations, the non-AP MLD 120 may include a single radio or may otherwise be capable of communicating on only one link at a time. In such implementations, the non-AP MLD 120 may operate in a multi-link single-radio (MLSR) mode or an enhanced MLSR (EMLSR) mode. A non-AP MLD that operates in the EMLSR mode can listen for specific types of communications (also referred to as "initial Control frames") on multiple communication links, concurrently, but can only transmit or receive on one communication link at any given time. The initial Control frame is a particular type of trigger frame that solicits a response, in the form of a TB PPDU, from one or more non-AP MLDs (or STAs). Example suitable initial Control frames include a multi-user request to send (MU-RTS) trigger frame and a buffer status report poll (BSRP) trigger frame.

A PPDU is communications packet conforming to the IEEE 802.11 standard. The PPDU format is a composite structure that includes a physical layer (PHY) preamble and a payload in the form of a PHY service data unit (PSDU). The information provided in the preamble may be used by a receiving device to decode the subsequent data in the PSDU. The PSDU may represent or "carry" one or more medium access control (MAC) protocol data unit (MPDU) frames. Each MPDU frame includes a MAC header followed by the data portion (also referred to as the "payload" or "frame body") of the MPDU frame. A TB PPDU is a particular type of PPDU that is transmitted as a response to a trigger frame. For example, a clear to send (CTS) frame can be carried in a TB PPDU responding to an MU-RTS trigger frame and a buffer status report (BSR) can be carried in a TB PPDU responding to a BSRP trigger frame.

When the non-AP MLD 120 is operating in the EMLSR mode, the STAs 122 and 124 may concurrently listen for wireless communications on their respective links 102 and 104 during a listen interval. However, if the STA 122 detects an initial Control frame (such as an MU-RTS trigger frame or a BSRP trigger frame) on link 102, the non-AP MLD 120 subsequently tunes each of its antennas (including the antenna used by the STA 124 during the listen interval) to operate on link 102. As described above, a TB PPDU must be transmitted a SIFS duration following the trigger frame that solicited the response. However, a non-AP MLD operating in the EMLSR mode may need time to tune its main radio to the communication link on which the TB PPDU is to be transmitted (which involves a number of PHY and MAC layer operations).

During association, the non-AP MLD 120 may indicate its transition time, for switching between communication links, to the AP MLD 110. To accommodate potential delays in switching between communication links and ensure that the non-AP MLD 120 can respond to a trigger frame within a SIFS duration, the AP MLD 110 may extend the duration of the trigger frame using padding bits. Padding bits do not carry any useful information (as they are generally all set to 1) and are merely used to keep the wireless channel occupied or busy while a non-AP MLD prepares to transmit a TB PPDU in response to the trigger frame. In other words, the padding bits are designed to prevent other wireless communication devices from sensing an idle medium (using CSMA/CA techniques) and attempting to capture the channel before the non-AP MLD has a chance to transmit the TB PPDU.

The AP MLD 110 selects the duration of padding in a trigger frame to accommodate the switching delay of the non-AP MLD having the slowest transition time among the non-AP MLDs solicited by the trigger frame. Current versions of the IEEE 802.11 standard support EMLSR padding delays equal to 0 µs, 32 µs, 64 µs, 128 µs, and 256 µs. In other words, padding bits can extend the duration of a trigger frame by up to 256 µs, which is a non-negligible amount of time. Thus, aspects of the present disclosure recognize that the transmission of padding bits in a trigger frame provide an opportunity for power saving by non-AP MLDs (and STAs) that receive the trigger frame but are not solicited to provide a response (in the form of a TB PPDU).

Figure 2:
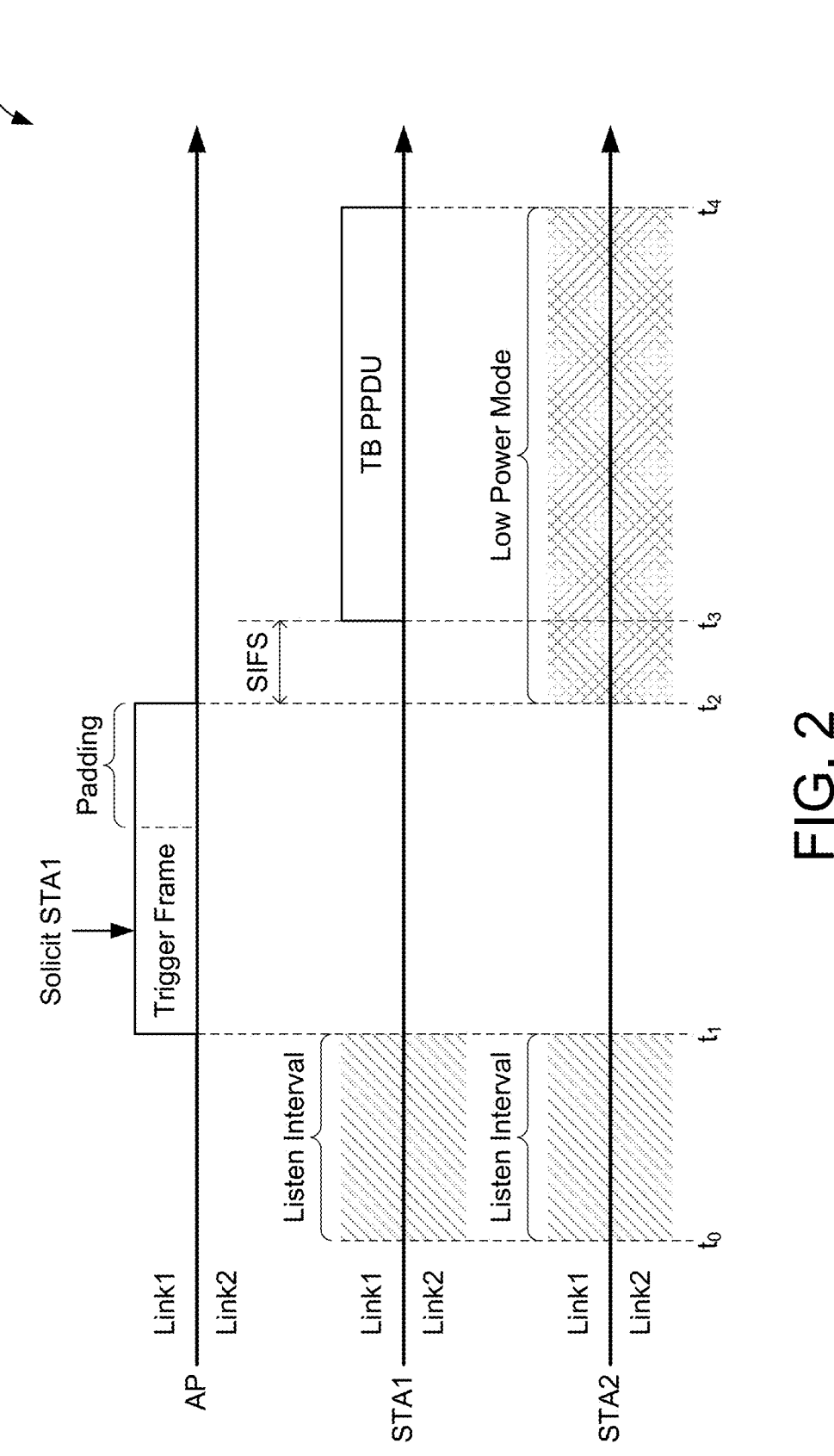
FIG. 2 shows a timing diagram depicting example wireless communications between an access point (AP) and a number of wireless stations (STAs) associated with the AP.

FIG. 2 shows a timing diagram 200 depicting example wireless communications between an AP and a number of wireless stations (STA1 and STA2) associated with the AP. In some implementations, the AP may be an AP MLD (such as the AP MLD 110 of FIG. 1) and each of the wireless stations STA1 and STA2 may be a non-AP MLD (such as the non-AP MLD 120). In the example of FIG. 2, the AP is configured to communicate with the wireless stations STA1 and STA2 via multiple communication links Link1 and Link2. In some implementations, each of the wireless stations STA1 and STA2 may be configured to operate in the EMLSR mode.

Each of the wireless stations STA1 and STA2 listens for wireless communications on Link1 and Link2, concurrently, between times $t_0$ and $t_1$ (also referred to as a "listen interval"). At time $t_1$, the AP transmits a trigger frame on Link1 which solicits a TB PPDU from STA1 (but not from STA2). For example, the trigger frame may include a user information field that identifies STA1 as an intended recipient. The user information field also may carry information for configuring or transmitting the TB PPDU. In some implementations, the trigger frame may be an MU-RTS trigger frame, and the TB PPDU may be configured to carry a CTS frame. In some other implementations, the trigger frame may be a BSRP trigger frame, and the TB PPDU may be configured to carry a BSR. Still further, in some implementations, the trigger frame may solicit an uplink (UL) data transmission frame each STA identified in the user information list, and the TB PPDU may carry UL data from the solicited STAs. In such implementations, the AP may further acknowledge receipt of the TB PDDU by transmitting a block acknowledgement (BA) message on Link1 (not shown for simplicity) a SIFS duration following reception of the TB PPDU.

STA1 receives the trigger frame from the AP, between times $t_1$ and $t_2$, and transmits a TB PPDU back to the AP, at time $t_3$, a SIFS duration following the end of the trigger frame. As described with reference to FIG. 1, a non-AP MLD operating in the EMLSR mode can listen for communications on multiple communication links, concurrently, but can only transmit or receive on one link at a time. Thus, STA1 may need time to switch from listening for the trigger frame on both wireless communication links Link1 and Link2 to transmitting the TB PPDU on Link1. The switching requirements of STA1 are known to the AP prior to transmitting the trigger frame. Thus, in some implementations, the AP may use padding to extend the duration of the trigger frame based on the switching requirements of STA1 and prevent other wireless communication devices from capturing the wireless channel associated with Link1 before STA1 can transmit the TB PPDU.

STA2 also receives the trigger frame form the AP, between times $t_1$ and $t_2$, but does not transmit a TB PPDU back to the AP in response thereto. For example, STA2 may determine that none of the user information fields in the trigger frame identifies STA2 as an intended recipient. Because the trigger frame does not solicit a TB PPDU from STA2, STA2 may operate in a low power mode for the duration of the TB PPDU transmission by STA1, between times $t_3$ and $t_4$. The trigger frame includes a frame check sequence (FCS) that can be used to validate the trigger frame (such as through a checksum validation process). In existing trigger frame formats, the FCS is only included at the very end of the trigger frame, which would prevent STA2 from entering the low power mode before time $t_2$. In other words, STA2 must wait for the FCS in order to validate the trigger frame.

Aspects of the present disclosure recognize that, because the padding bits do not carry any useful information, STA2 could achieve even greater power savings by entering the low power mode during the transmission of the padding bits. However, in existing trigger frame formats, the padding bits are transmitted before the FCS. As such, a STA must receive the padding bits in order to use the FCS at the end of the trigger frame for checksum validation. In some aspects, the AP may insert an "early" FCS (eFCS) into the trigger frame, before FCS and the padding bits (if any). The eFCS may be used to validate a portion of the trigger frame that carries useful information. Unlike the FCS at the end of the trigger frame, padding bits (if any) are not included in the checksum validation process associated with an eFCS. Thus, any STAs that are not solicited by a trigger frame (such as STA2) can validate the trigger frame based on the eFCS and enter a low power mode prior to (and in lieu of) receiving any padding bits that may be included in the trigger frame.

Figure 3:
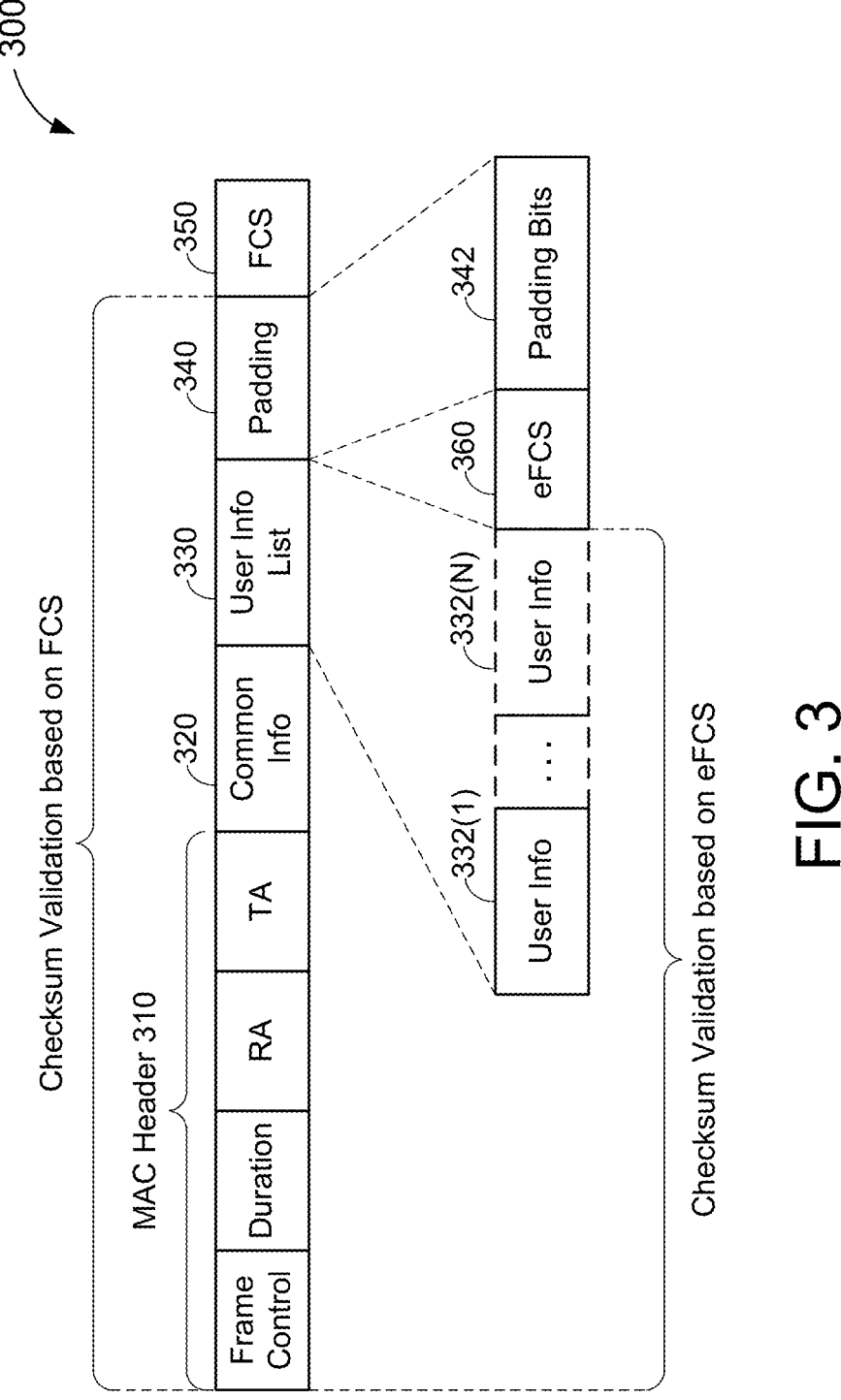
FIG. 3 shows an example trigger frame usable for wireless communications between an AP and a number of STAs, according to some implementations.

FIG. 3 shows an example trigger frame 300 usable for wireless communications between an AP and a number of STAs, according to some implementations. The trigger frame 300 may be used to solicit a TB PPDU from one or more STAs (such as described with reference to FIG. 2).

The trigger frame 300 includes a MAC header 310, a common information field 320, a user information list 330, a padding field 340, and an FCS 350. The MAC header 310 includes a frame control field, a duration field, a receiver address (RA) field, and a transmitter address (TA) field. The common information field 320 and user information list 330 carry configuration information which may be used by a receiving device to configure a TB PPDU for transmission in response to receiving the trigger frame 300. In some aspects, the user information list 330 may include a number (N) of user information fields 332(1)-332(N) each carrying per-user information for a respective STA. In contrast, the common information field 320 may carry information that is common to all recipients of the trigger frame 300 (such as any users identified in the user information list 330). The padding field 340 includes zero or more padding bits 342.

In some implementations, the trigger frame 300 may further include an eFCS 360 inserted between the N$^{th}$ (or last) user information field 332(N) of the user information list 330 and the padding bits 342. The eFCS 360 may be used to validate a portion of the trigger frame 300 that includes any fields or subfields preceding the eFCS 360 (such as the MAC header 310, the common information field 320, the user information list 330, and the user information fields 332(1)-332(N)) and does not include any fields or subfields following the eFCS 360 (such as the padding bits 342 and the FCS 350). By contrast, the FCS 350 is used to validate the trigger frame 300 in its entirety, including the MAC header 310, the common information field 320, the user information fields 332(1)-332(N), the eFCS 360, and the padding bits 342.

In some implementations, a STA that receives the trigger frame 300 but is not solicited to transmit a TB PPDU may enter a low power mode prior to (and in lieu of) receiving the padding bits 342. For example, after parsing the MAC header 310 and the common information field 320, the STA may scan the user information list 330 for a user information field intended for the STA. Each of the user information fields 332(1)-332(N) includes an association identifier (AID) subfield having a value that identifies the recipient of the user information field. An AP assigns a unique AID to each of its associated STAs and uses the AIDs to identify and track each STA in its BSS. If a STA does not detect its assigned AID in the AID subfield of any of the N user information fields 332(1)-332(N), the STA may validate the first portion of the trigger frame 300 based on the eFCS 360 and immediately enter a low power mode if the validation is successful.

A STA that detects its assigned AID in one of the user information fields 332(1)-332(N) is solicited to transmit a TB PPDU. As such, a solicited STA may not enter a low power mode prior to receiving the padding bits 342. In some aspects, a STA that receives the trigger frame 300 and is solicited to transmit a TB PDDU may refrain from performing a checksum validation operation on the first portion of the trigger frame 300 based on the eFCS 360 (or may otherwise ignore the eFCS 360). Instead, the STA may perform a checksum validation operation on the trigger frame 300 in its entirety based on the FCS 350. In some other aspects, a STA that receives the trigger frame 300 and is solicited to transmit a TB PPDU may perform a checksum validation operation on the first portion of the trigger frame 300, based on the eFCS 360, in addition to (or in lieu of) performing a checksum validation operation on the trigger frame 300 in its entirety, based on the FCS 350.

In some implementations, performing multiple checksum validation operations, based on the FCS 350 and the eFCS 360, may provide redundancy for detecting errors in the trigger frame 300. In some instances, a result of the earlier checksum validation operation, based on the eFCS 360, may conflict with a result of the later checksum validation operation, based on the FCS 350. Aspects of the present disclosure recognize that discrepancies between the results of the checksum validation operations may be attributed to errors in the padding bits 342 (or the padding field 340), which do not carry any meaningful information. Thus, in some implementations, a STA may resolve such discrepancies in favor of the earlier checksum validation operation based on the eFCS 360. In other words, a STA may successfully validate the trigger frame 300 if it passes the earlier checksum validation operation (based on the eFCS 360) but fails the later checksum validation operation (based on the FCS 350). Such implementations may further increase the frequency or likelihood of successful TB PPDU transmissions.

Figure 4:
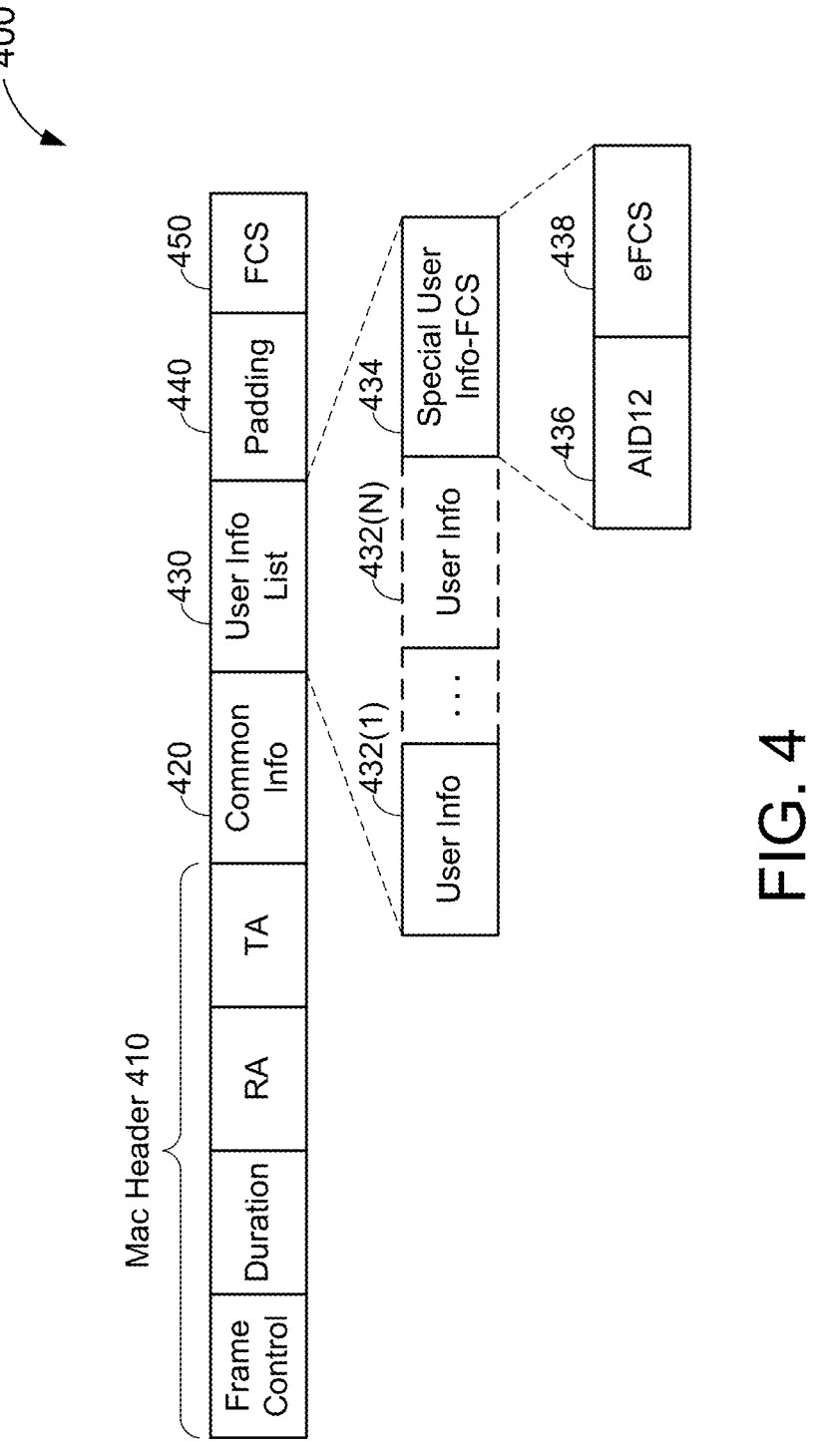
FIG. 4 shows another example trigger frame usable for wireless communications between an AP and a number of STAs, according to some implementations.

FIG. 4 shows another example trigger frame 400 usable for wireless communications between an AP and a number of STAs, according to some implementations. The trigger frame 400 may be used to solicit a TB PPDU from one or more STAs (such as described with reference to FIG. 2). In some implementations, the trigger frame 400 may be one example of the trigger frame 300 of FIG. 3.

The trigger frame 400 includes a MAC header 410, a common information field 420, a user information list 430, a padding field 440, and an FCS 450. The MAC header 410 includes a frame control field, a duration field, an RA field, and a TA field. The common information field 420 and user information list 430 carry configuration information which may be used by a receiving device to configure a TB PPDU for transmission in response to receiving the trigger frame 400. In some aspects, the user information list 430 may include a number (N) of user information fields 432(1)-432(N) each carrying per-user information for a respective STA. In contrast, the common information field 420 may carry information that is common to all recipients of the trigger frame 400.

In some implementations, the user information list 430 may further include a special user information field 434 that carries an eFCS 438. Thus, the special user information field 434 may be referred to herein as a "special user info-FCS field." As described with reference to FIG. 3, each user information field in the user information list 430 is identified by a unique AID value assigned to a particular STA (or user) in a BSS. By contrast, the special user info-FCS field 434 may include an AID subfield 436 (denoted "AID12" based on the number of bits associated with each AID value) that is not assigned to any STA in the BSS. For example, the AID subfield 436 may have a value that is currently reserved in existing versions of the IEEE 802.11 standard (such as any value between 2047-4094, inclusive). In some implementations, the special user info-FCS field 434 may be the last field in the user information list 430. In other words, the special user-info FCS field 434 may follow the N$^{th}$ user information field 432(N) and precede the padding field 440.

The eFCS 438 may be used to validate a portion of the trigger frame 400 that includes any fields or subfields preceding the eFCS 438 (such as described with reference to FIG. 3). In some implementations, a STA may indicate its support for eFCS-based trigger frame validation duration association with an AP. A STA that supports eFCS-based trigger frame validation may detect the special user info-FCS field 434 in the trigger frame 400 based on the value of the AID subfield 436 and use the eFCS 438 to validate the first portion of the trigger frame 400. A STA that does not support eFCS-based trigger frame validation (such as a legacy STA) may view the AID subfield 436 as having a "reserved" value. As a result, the legacy STA may ignore the special user info-FCS field 434 and proceed to validate the trigger frame 400 based on the FCS 450. Accordingly, the design of the trigger frame 400 is backwards compatible with legacy versions of the IEEE 802.11 standard.

Figure 5:
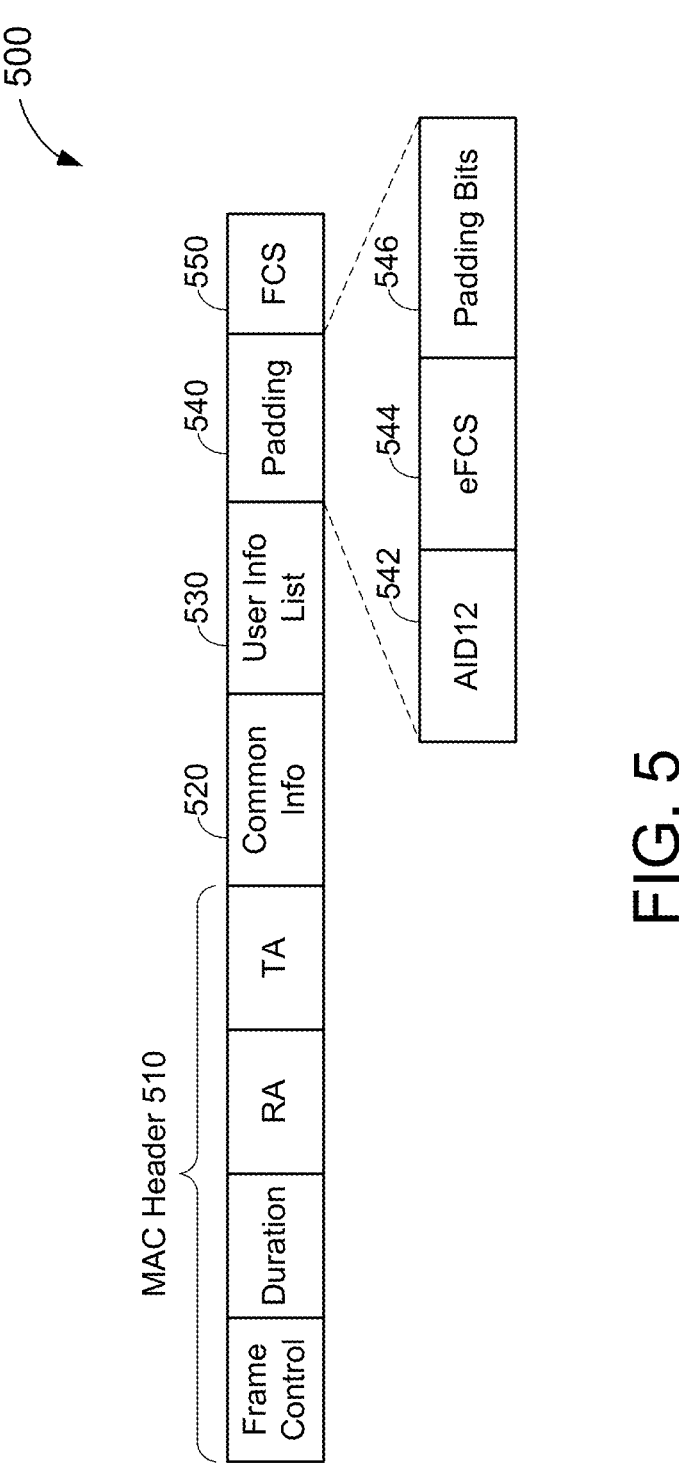
FIG. 5 shows another example trigger frame usable for wireless communications between an AP and a number of STAs, according to some implementations.

FIG. 5 shows another example trigger frame 500 usable for wireless communications between an AP and a number of STAs, according to some implementations. The trigger frame 500 may be used to solicit a TB PPDU from one or more STAs (such as described with reference to FIG. 2). In some implementations, the trigger frame 500 may be one example of the trigger frame 300 of FIG. 3.

The trigger frame 500 includes a MAC header 510, a common information field 520, a user information list 530, a padding field 540, and an FCS 550. The MAC header 510 includes a frame control field, a duration field, an RA field, and a TA field. The common information field 520 and user information list 530 carry configuration information which may be used by a receiving device to configure a TB PPDU for transmission in response to receiving the trigger frame 500. In some aspects, the user information list 530 may include a number (N) of user information fields (such as the user information fields 332(1)-332(N) of FIG. 3) each carrying per-user information for a respective STA. In contrast, the common information field 520 may carry information that is common to all recipients of the trigger frame 500.

In some implementations, the padding field 540 may include an AID subfield 542 (denoted "AID12" based on the number of bits associated with each AID value), an eFCS 544, and zero or more padding bits 546. As described with reference to FIG. 3, each user information field in the user information list 530 is identified by a unique AID value assigned to a particular STA (or user) in a BSS. By contrast, according to existing versions of the IEEE 802.11 standard, the padding field 540 is identified by an AID value equal to 4095 (which cannot be assigned to any user or STA). In other words, an AID subfield having a value equal to 4095 signals the end of the user information list 530 and the beginning of the padding field 540. In some implementations, the eFCS 544 may immediately follow the AID subfield 542 and immediately precede the padding bits 546 (if any).

The eFCS 544 may be used to validate a portion of the trigger frame 500 that includes any fields or subfields preceding the eFCS 544 (such as described with reference to FIG. 3). In some implementations, a STA may indicate its support for eFCS-based trigger frame validation duration association with an AP. A STA that supports eFCS-based trigger frame validation may detect the eFCS 544 in the padding field 540 of the trigger frame 500 based on the value of the AID subfield 542 and use the eFCS 544 to validate the first portion of the trigger frame 500. A STA that does not support eFCS-based trigger frame validation (such as a legacy STA) may view the AID subfield 542 as the start of padding and may interpret the eFCS 544 as a continuation of the padding bits 546. As a result, the legacy STA may ignore the eFCS 544 and proceed to validate the trigger frame 500 based on the FCS 550. Accordingly, the design of the trigger frame 500 is backwards compatible with legacy versions of the IEEE 802.11 standard.

Figure 6:
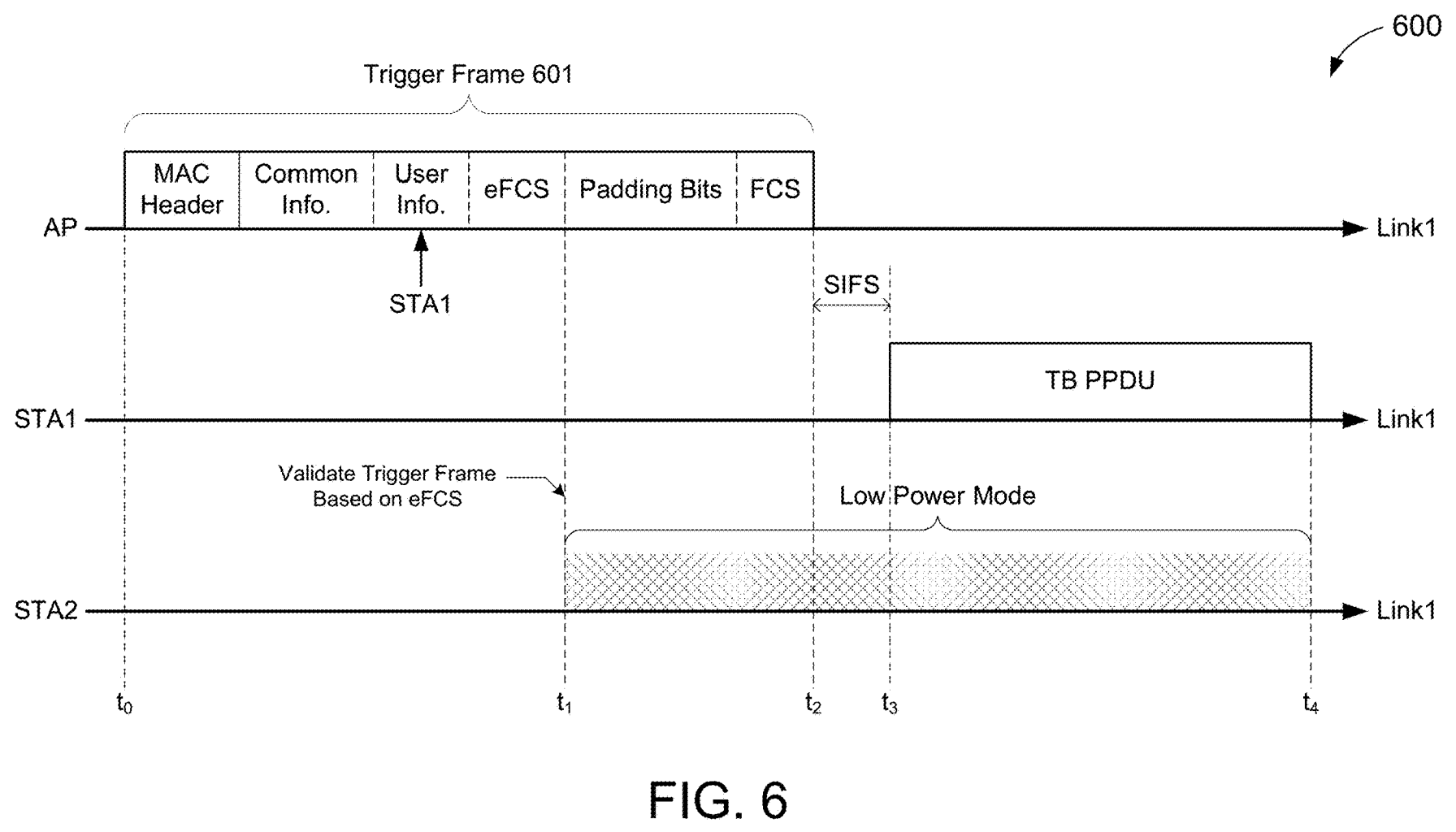

FIG. 6 shows another timing diagram 600 depicting example wireless communications between an AP and a number of wireless stations (STA1 and STA2) associated with the AP, according to some implementations. In some implementations, the AP may be an AP MLD (such as the AP MLD 110 of FIG. 1) and each of the wireless stations STA1 and STA2 may be a non-AP MLD (such as the non-AP MLD 120). In the example of FIG. 6, the AP may be configured to communicate with the wireless stations STA1 and STA2 via multiple communication links, however, only one of the communication links (Link1) is shown for simplicity. In some implementations, each of the wireless stations STA1 and STA2 may be configured to operate in the EMLSR mode.

At time $t_0$, the AP transmits a trigger frame 601 on Link1 which solicits a TB PPDU from STA1 (but not from STA2). In some implementations, the trigger frame 601 may be one example of any of the trigger frames 300, 400, or 500 of FIGS. 3-5, respectively. For example, the trigger frame 601 may include a MAC header, a common information field, a user information field, an eFCS, a number of padding bits following the eFCS, and an FCS following the padding bits. The user information field includes an AID subfield that matches an AID assigned to STA1. In some implementations, the eFCS may be carried in a special user information field of a user information list (such as the special user info-FCS field 434 of FIG. 4). In some other implementations, the eFCS may be carried in a padding field (such as the padding field 540 of FIG. 5).

STA1 receives the trigger frame 601 from the AP, between times $t_0$ and $t_2$, and transmits a TB PPDU back to the AP, at time $t_3$, a SIFS duration following the end of the trigger frame 601. For example, STA1 may determine that the value of the AID subfield of the user information field matches an AID assigned to STA1. In response thereto, STA1 may configure the TB PPDU for transmission on Link1 according to the parameters specified in the user information field. In some implementations, STA1 may validate a first portion of the trigger frame 601 (up to and including the user information field), at time $t_1$, based on the eFCS. In some other implementations, STA1 may ignore the eFCS and validate the trigger frame 601 (in its entirety), at time $t_2$, based on the FCS at the end of the trigger frame 601.

Figure 7:
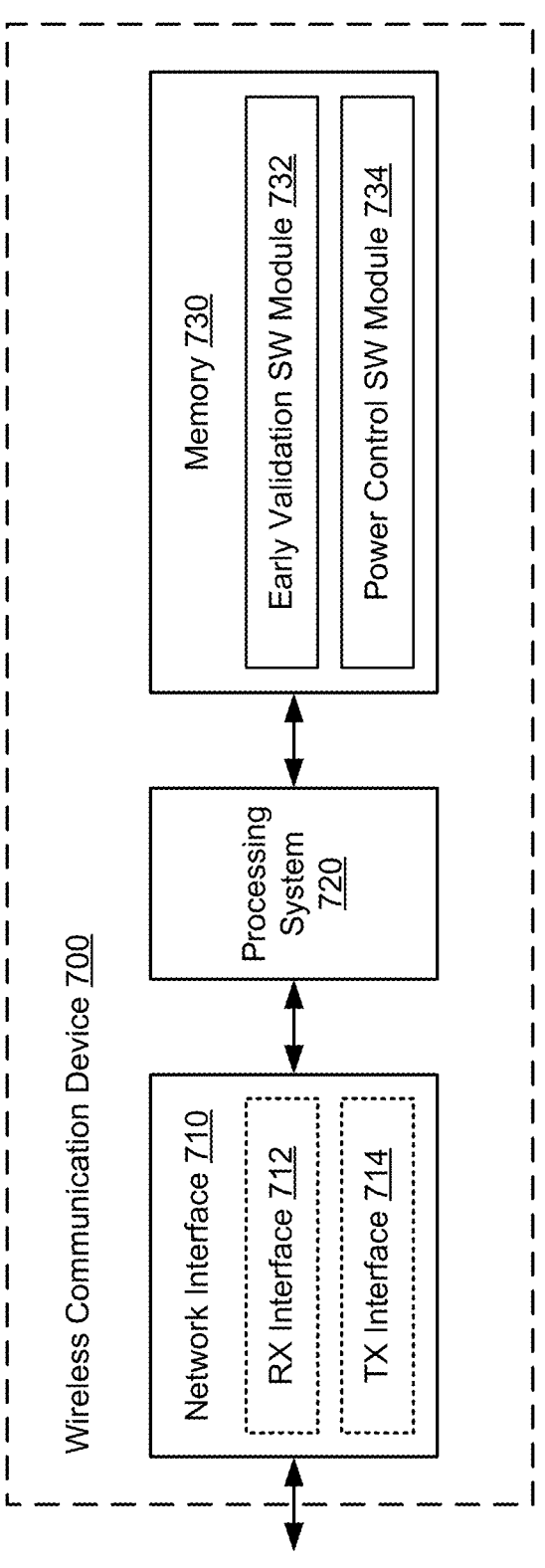
FIG. 7 shows a block diagram of an example wireless communication device, according to some implementations.

STA2 also receives the trigger frame 601 but does not transmit a TB PPDU to the AP in response thereto. For example, STA2 may determine that none of the user information fields in the trigger frame 601 includes an AID subfield that matches an AID assigned to STA2. In some implementations, STA2 may validate a first portion of the trigger frame 601 (up to and including the user information field), at time $t_1$, based on the eFCS. After successfully validating the first portion of the trigger frame 601, STA2 may enter a low power mode (at time $t_1$) and remain in the low power mode until STA1 has completed its transmission the TB PPDU transmission, at time $t_4$. Specifically, STA2 may enter the low power mode prior to (and in lieu of) receiving the padding bits in the trigger frame 601. Thus, the trigger frame 601 allows non-solicited STAs to achieve even greater power savings compared to existing trigger frame formats. FIG. 7 shows a block diagram of an example wireless communication device 700, according to some implementations. The wireless communication device 700 can be a chip, system-on-a-chip (SoC), chipset, package, or device that includes at least one processor and at least one modem. In some implementations, the wireless communication device 700 may be one example of the non-AP MLD 120 of FIG. 1.

The wireless communication device 700 includes a network interface 710, a processing system 720, and a memory 730. The device interface 710 is configured to communicate with one or more other wireless communication devices. For example, the device interface 710 may include a receive (RX) interface 712 and a transmit (TX) interface 714. The RX interface 712 is configured to receive RX signals, over a wireless channel, from one or more other wireless communication devices and the TX interface 714 is configured to transmit TX signals, over a wireless channel, to one or more other wireless communication devices. In some implementations, the RX interface 712 may receive a trigger frame soliciting a TB PPDU from one or more wireless communication devices, where the trigger frame includes one or more user information fields, a first FCS following the one or more user information fields, a plurality of padding bits following the first FCS, and a second FCS following the plurality of padding bits.

The memory 730 may include a non-transitory computer-readable medium (including one or more nonvolatile memory elements, such as EPROM, EEPROM, Flash memory, or a hard drive, among other examples) that may store at least the following software (SW) modules:

an early validation SW module 732 to validate a portion of the trigger frame based on the first FCS; and a power control SW module 734 to selectively enter a low power mode, based on the one or more user information fields, in response to validating the portion of the trigger frame and without receiving the plurality of padding bits.

Each software module includes instructions that, when executed by the processing system 720, causes the wireless communication device 700 to perform the corresponding functions.

The processing system 720 may include any suitable one or more processors capable of executing scripts or instructions of one or more software programs stored in the wireless communication device 700 (such as in the memory 730). For example, the processing system 720 may execute the early validation SW module 732 to validate a portion of the trigger frame based on the first FCS. The processing system 720 also may execute the power control SW module 734 to selectively enter a low power mode, based on the one or more user information fields, in response to validating the portion of the trigger frame and without receiving the plurality of padding bits.

FIG. 8 shows an illustrative flowchart depicting an example trigger frame validation operation 800 based on an early FCS (eFCS), according to some implementations. In some implementations, the example operation 800 may be performed by a wireless communication device such as the non-AP MLD 120 of FIG. 1 or the wireless communication device 700 of FIG. 7. In some implementations, the wireless communication device may be configured to operate in an EMLSR mode.

The wireless communication device receives a trigger frame soliciting a TB PPDU from one or more wireless communication devices, where the trigger frame includes one or more user information fields, a first FCS following the one or more user information fields, a plurality of padding bits following the first FCS, and a second FCS following the plurality of padding bits (810). The wireless communication device validates a portion of the trigger frame based on the first FCS (820). The wireless communication device selectively enters a low power mode, based on the one or more user information fields, in response to validating the portion of the trigger frame and without receiving the plurality of padding bits (830).

In some implementations, the selective entering of the low power mode may include determining whether any of the one or more user information fields includes an AID subfield having a value that matches an AID associated with the wireless communication device and entering the low power mode responsive to determining that none of the user information fields includes an AID subfield having a value that matches the AID associated with the wireless communication device. In some implementations, the wireless communication device may be configured to remain in the low power mode for a duration of the TB PPDU.

In some implementations, the selective entering of the low power mode may include determining whether any of the one or more user information fields includes an AID subfield having a value that matches an AID associated with the wireless communication device and refraining from entering the low power mode responsive to determining that one of the user information fields includes an AID subfield having a value that matches the AID associated with the wireless communication device. In some implementations, the wireless communication device may further validate the trigger frame based on the second FCS and transmit the TB PPDU in response to validating the trigger frame.

In some aspects, the first FCS may be carried in a special user information field following the one or more user information fields. In some implementations, the special user information field may include an AID subfield having a value different than any AIDs associated with the one or more wireless communication devices. In some other aspects, the first FCS and the plurality of padding bits may be carried in a padding field following the one or more user information fields. In some implementations, the padding field may include an AID subfield having a value equal to 4095.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for wireless communication by a wireless communication device, comprising:

receiving a first portion of a trigger frame soliciting a trigger-based (TB) physical layer convergence protocol (PLCP) protocol data unit (PPDU) from one or more wireless communication devices, the trigger frame including one or more user information fields, a first frame check sequence (FCS) following the one or more user information fields, a plurality of padding bits following the first FCS, and a second FCS following the plurality of padding bits;

validating the first portion of the trigger frame based on the first FCS; and selectively entering a low power mode which prevents the wireless communication device from receiving a second portion of the trigger frame that includes the plurality of padding bits, based on the one or more user information fields, in response to validating the first portion of the trigger frame.

2. The method of claim 1, wherein the wireless communication device is configured to operate in an enhanced multi-link single-radio (EMLSR) mode.

3. The method of claim 1, wherein the selective entering of the low power mode comprises:

determining whether any of the one or more user information fields includes an association identifier (AID) subfield having a value that matches an AID associated with the wireless communication device; and entering the low power mode responsive to determining that none of the user information fields includes an AID subfield having a value that matches the AID associated with the wireless communication device.

4. The method of claim 3, wherein the wireless communication device is configured to remain in the low power mode for a duration of the TB PPDU.

5. The method of claim 1, wherein the selective entering of the low power mode comprises:

determining whether any of the one or more user information fields includes an AID subfield having a value that matches an AID associated with the wireless communication device; and refraining from entering the low power mode responsive to determining that one of the user information fields includes an AID subfield having a value that matches the AID associated with the wireless communication device.

6. The method of claim 5, further comprising:

validating the trigger frame based on the second FCS; and transmitting the TB PPDU in response to validating the trigger frame.

7. The method of claim 1, wherein the first FCS is carried in a special user information field following the one or more user information fields.

8. The method of claim 7, wherein the special user information field includes an AID subfield having a value different than any AIDs associated with the one or more wireless communication devices.

9. The method of claim 1, wherein the first FCS and the plurality of padding bits are carried in a padding field following the one or more user information fields.

10. The method of claim 9, wherein the padding field includes an AID subfield having a value equal to 4095.

11. A wireless communication device, comprising:

a processing system; and a memory storing instructions that, when executed by the processing system, cause the wireless communication device to:

receive a first portion of a trigger frame soliciting a trigger-based (TB) physical layer convergence protocol (PLCP) protocol data unit (PPDU) from one or more wireless communication devices, the trigger frame including one or more user information fields, a first frame check sequence (FCS) following the one or more user information fields, a plurality of padding bits following the first FCS, and a second FCS following the plurality of padding bits;

validate the first portion of the trigger frame based on the first FCS; and selectively enter a low power mode which prevents the wireless communication device from receiving a second portion of the trigger frame that includes the plurality of padding bits, based on the one or more user information fields, in response to validating the first portion of the trigger frame.

12. The wireless communication device of claim 11, wherein the wireless communication device is configured to operate in an enhanced multi-link single-radio (EMLSR) mode.

13. The wireless communication device of claim 11, wherein the selective entering of the low power mode comprises:

determining whether any of the one or more user information fields includes an association identifier (AID) subfield having a value that matches an AID associated with the wireless communication device; and entering the low power mode responsive to determining that none of the user information fields includes an AID subfield having a value that matches the AID associated with the wireless communication device.

14. The wireless communication device of claim 13, wherein the wireless communication device is configured to remain in the low power mode for a duration of the TB PPDU.

15. The wireless communication device of claim 11, wherein the selective entering of the low power mode comprises:

determining whether any of the one or more user information fields includes an AID subfield having a value that matches an AID associated with the wireless communication device; and refraining from entering the low power mode responsive to determining that one of the user information fields includes an AID subfield having a value that matches the AID associated with the wireless communication device.

16. The wireless communication device of claim 15, wherein execution of the instructions further causes the wireless communication device to:

validate the trigger frame based on the second FCS; and transmit the TB PPDU in response to validating the trigger frame.

17. The wireless communication device of claim 11, wherein the first FCS is carried in a special user information field following the one or more user information fields.

18. The wireless communication device of claim 17, wherein the special user information field includes an AID subfield having a value different than any AIDs associated with the one or more wireless communication devices.

19. The wireless communication device of claim 11, wherein the first FCS and the plurality of padding bits are carried in a padding field following the one or more user information fields.

20. The wireless communication device of claim 19, wherein the padding field includes an AID subfield having a value equal to 4095.

* * * * *